H. OBRECHT.
Meat Chopper.

No. 79,678.

Patented July 7, 1868.

Witnesses:

Inventor:
H. Obrecht
per Munn & Co.
Attorneys.

United States Patent Office.

HENRY OBRECHT, OF MAHANOY CITY, PENNSYLVANIA, ASSIGNOR TO SAMUEL REINHART AND JOHN C. KNAPP, OF SAME PLACE.

Letters Patent No. 79,678, dated July 7, 1868.

IMPROVED MEAT-CUTTER.

The Schedule referred to in these Letters Patent and making part of the same.

TO ALL WHOM IT MAY CONCERN:

Be it known that I, HENRY OBRECHT, of Mahanoy City, in the county of Schuylkill, and State of Pennsylvania, have invented a new and improved Meat-Chopping Machine; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
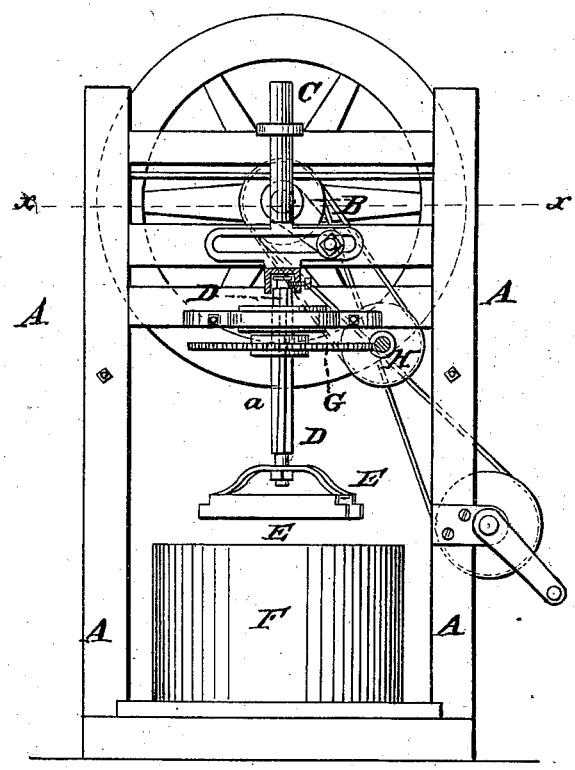
Figure 1 represents a front elevation of my improved meat-chopping machine.
Figure 2:
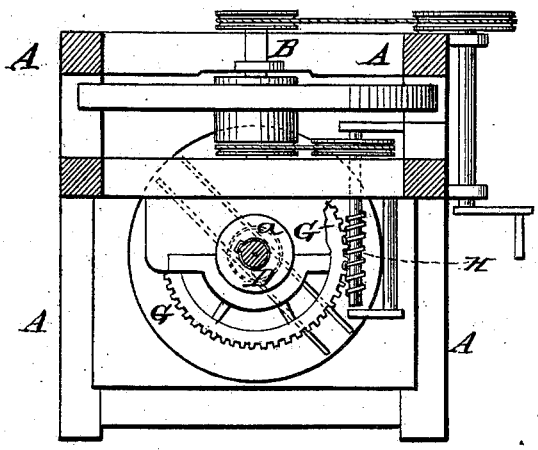
Figure 2 is a horizontal sectional view of the same, the plane of section being indicated by the line $x$ $x$, fig. 1.

This invention relates to a new machine for chopping meat or other articles, and consists in imparting to the cutter or cutters, besides an up-and-down reciprocating, a slow rotary motion. The cutters are fastened to the lower end of a vertical shaft, which is swivelled in and suspended from an up-and-down reciprocating block or other device, said shaft also passing through the centre of a wheel, to which slow rotary motion is imparted, the shaft or wheel having a feather, so that the shaft is turned by the wheel, and may still move up and down through the same.

A, in the drawing, represents a frame, of suitable construction and size, in which are the bearings for the shafts operating the cutters E.

B is a horizontal driving-shaft, having its bearings in the frame A, and imparting up-and-down reciprocating motion to a slotted bar, C. The shaft B receives rotary motion from suitable mechanism.

From the bar C is suspended, and to it is swivelled, a bar, D, to the lower end of which a cutter or cutters, E, are secured, which are, as they receive up-and-down reciprocating motion, pressed upon a stationary block, F, upon which the meat or other article to be chopped is placed.

The bar D passes through a horizontal gear-wheel, G, which receives slow rotary motion by means of a worm, H, or otherwise, said worm or other device receiving rotary motion from the shaft B.

The bar D has a feather, $a$, or its equivalent, by means of which the rotary motion is imparted to it from the wheel G, through which it passes readily during its up-and-down movement. The cutters E thus receive up-and-down reciprocating and horizontal rotary motion, and will cut the meat or other article on the stationary block F into very small pieces.

Having thus described my invention, what I claim as new, and desire to secure by Letters Patent, is—

The bar D, when swivelled to the up-and-down reciprocating bar or plate C, and when passing through and connected with the revolving wheel or disk G, all made and operating substantially as herein shown and described.

H. OBRECHT.

Witnesses:
G. K. RICHARD,
JACOB DEAM.